United States Patent [19]

Burris

[11] 4,239,258
[45] Dec. 16, 1980

[54] FOLD-UP TRAILER ASSEMBLY

[76] Inventor: Frank H. Burris, 4165 Oak Hollow Rd., Claremont, Calif. 91711

[21] Appl. No.: 968,455

[22] Filed: Dec. 11, 1978

[51] Int. Cl.³ ............................................. B62D 63/00
[52] U.S. Cl. .................................................... 280/639
[58] Field of Search ..................... 280/639; 296/26, 27; 224/42.08

[56] References Cited

U.S. PATENT DOCUMENTS

| | | | |
|---|---|---|---|
| 2,080,709 | 8/1935 | Hall et al. | 280/639 X |
| 2,809,046 | 4/1955 | Andersson | 280/639 |

Primary Examiner—Stanley H. Tollberg
Attorney, Agent, or Firm—Boniard I. Brown

[57] ABSTRACT

An improved retractable fold-up and extensible trailer typically for towing behind automotive vehicles, wherein the respective load accommodating sections of the trailer are interfittable and foldable into a compact configuration for storage and are extensible to form an enlarged trailer or bed for use. Essentially the trailer bed is in three sections, a center section attached to a wheel and axle assembly, and forward and rearward sections hingedly connected thereto. Latches are provided to retain the sections in either folded or unfolded positions, and a retractable tongue is provided on the front section for towing. The trailer may have nesting side portions or may be adapted to accommodate removable sides constructed in conventional stake body form.

10 Claims, 12 Drawing Figures

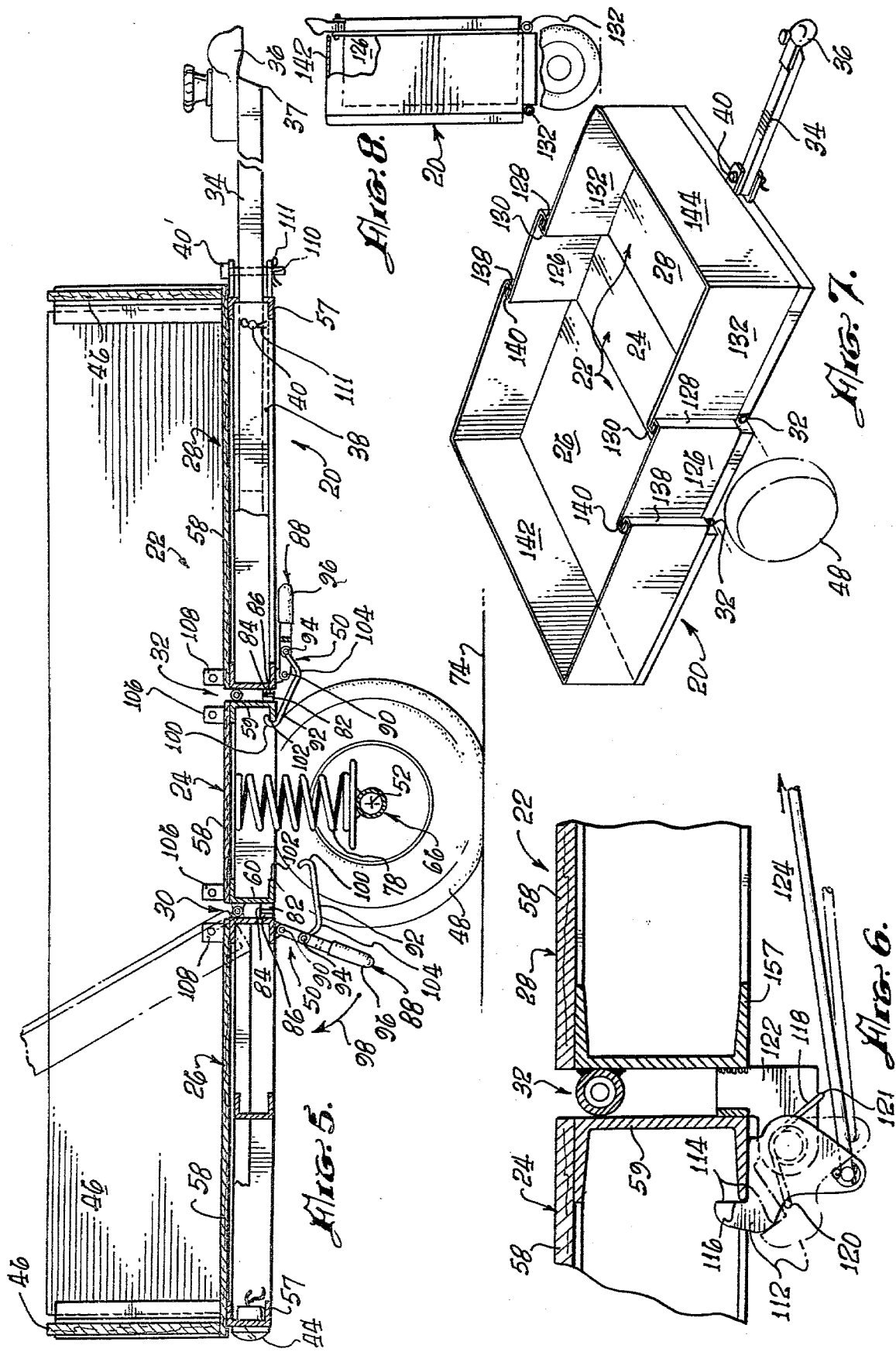

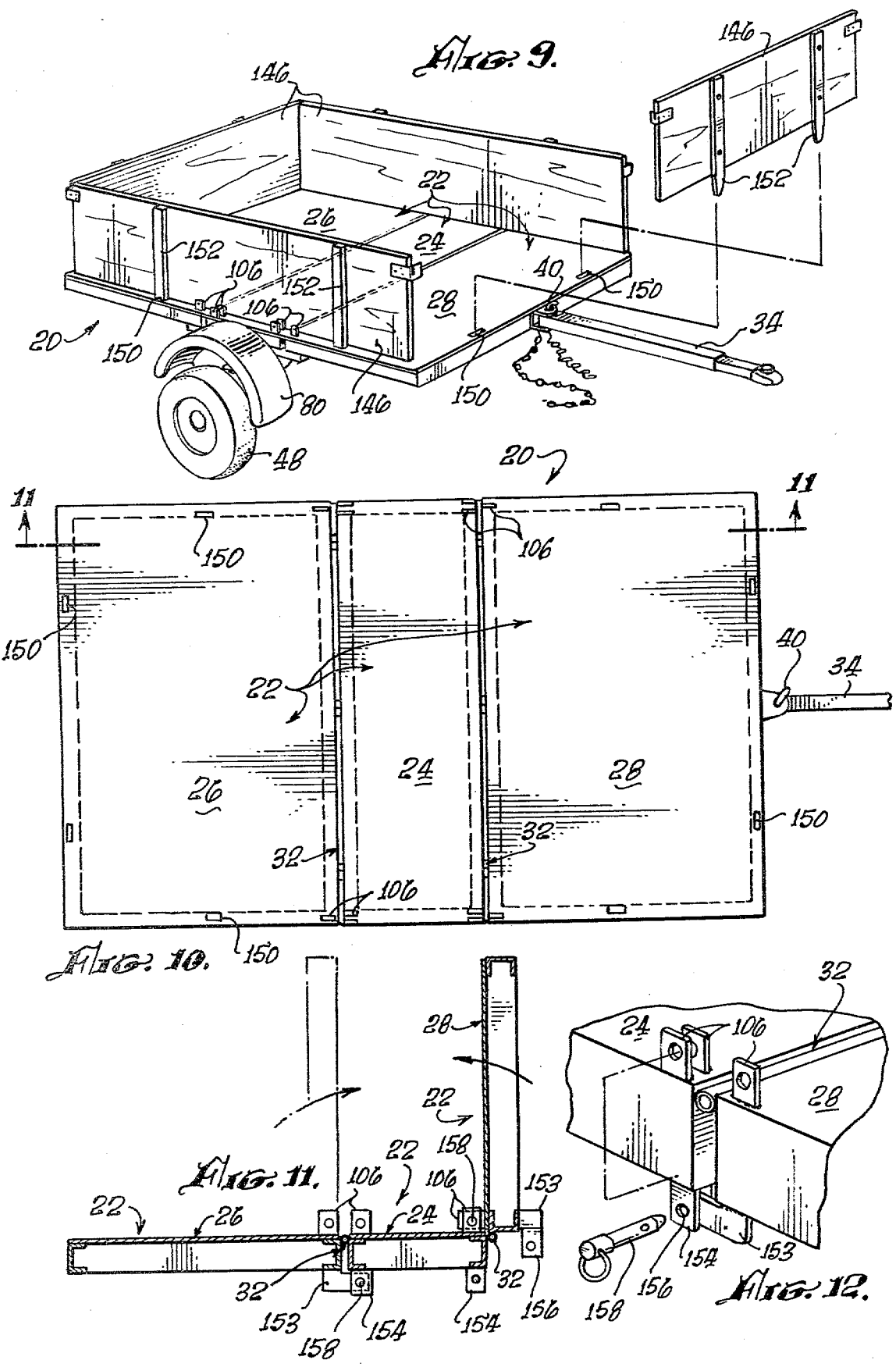

FOLD-UP TRAILER ASSEMBLY

Trailers, especially those designed to be hauled behind automobiles or light trucks are extremely handy when needed but bulky and difficult to store when not in use. Various attempts have been made to solve this problem such as disclosed in Steiner, U.S. Pat. No. 2,686,075 which teaches a collapsible body for automobile trailers. Although the Steiner collapsible body allows his trailer to be conveniently towed behind an automobile with reduced air resistance, the amount of space saving that occurs when folded for storage is relatively small and limited to a portion of the back section thereof. Torrance in U.S. Pat. No. 2,691,546 discloses a collapsable trailer of the single wheel type which folds along the longitudinal axis thereof into a laterally expandable package which rests above the single wheel. This type of folding only saves space when used in combination with a single wheel suspension but single wheel trailers are generally unstable and only are capable of transporting light loads safely. Meeker, et al in U.S. Pat. No. 2,987,342 also discloses a laterally expansible chassis which is used for a house trailer, so that the sides thereof can be expanded rather than compressed once the trailer has been parked. The length of the Meeker trailer always remains the same. Daughenbaugh, et al in U.S. Pat. No. 3,833,954 discloses a telescoping transportable shelter which can be set on end and expanded but whose chassis remains essentially the same size although turned and oriented vertically in an unusual position.

The most pertinent prior art found by Applicant is Lefeber, U.S. Pat. No. 3,838,880 which discloses a folding house trailer with box-like end sections which are pivoted on the floor and foldable to nest within each other. Of course, such means, like Meeker's and Daughenbaugh's expand the trailer for stationary use and contract it for towing rather than expand it for towing and contract it for stationary storage.

There has therefore been a need for a trailer with a relatively large capacity which can be stored in no more space than is required to store the axles and wheels thereof.

BRIEF DESCRIPTION OF THE PRESENT INVENTION

The present trailer includes a trailer bed constructed in three sections each of which extends transversely across the trailer. Forward and aft sections are hingedly connected by transverse hinges to a center section and latch means are provided to lock the sections into a planar structure for use or with the outer sections vertical with respect to the center section for storage. The center section is approximately as long as the diameter of the wheels positioned thereunder so that when the outer sections are positioned vertically, the entire trailer covers a ground area approximately the same size as required for the axles and wheels thereof. A tongue is connected to the front trailer section by being pinned to a channel member forming a part thereof either in a extended towing position or in a retracted storage position. Either stake sides or nestable interlocking sides can be provided on the trailer sections as is desired.

It is therefore an object of the present invention to provide a relatively large and load capable trailer which can be stored in a relatively small area.

Another object is to provide a foldable trailer which can be constructed for very little more than a non-folding trailer.

Another object is to provide a folding trailer which is stable and stiff when extended for use and yet is easily folded for storage.

These and other objects and advantages of the present invention will become apparent to those skilled in the art after considering the following detailed specification in conjunction with the accompanying drawings wherein:

BRIEF DESCRIPTION OF THE DRAWINGS

FIG. 1 is a side view of a trailer constructed according to the present invention in its extended position;

FIG. 2 is a side view of the trailer of FIG. 1 in its folded position;

FIG. 3 is a cross-sectional view taken on line 3—3, of FIG. 1 showing the details of the axle suspension of the trailer;

FIG. 4 is a partial plan view of the trailer of FIGS. 1, 2 and 3 as viewed in the direction of the arrows indicated in FIG. 3, showing details of the axle suspension thereof;

FIG. 5 is a side cross-sectional view taken at line 5—5 in FIG. 3;

FIG. 6 is an enlarged detailed view showing an alternate latch for maintaining the trailer in an unfolded position;

FIG. 7 is a schematic perspective view showing a nestable side modification to the present invention;

FIG. 8 is a side view of the trailer of FIG. 7 shown in a folded position;

FIG. 9 is perspective view showing the trailer of FIGS. 1 through 6 with removable interlocking stake sides;

FIG. 10 is a top view of the trailer of FIG. 9;

FIG. 11 is a detailed cross-sectional view showing an alternate latching arrangement for the trailer frame as shown in FIGS. 9 and 10; and FIG. 12 is a perspective detailed view of the latch arrangement of FIG. 11.

DETAILED DESCRIPTION OF THE SHOWN EMBODIMENT

Referring to the drawings more particularly by reference numbers, number 20 in FIG. 1 refers to a trailer constructed according to the present invention. The trailer 20 includes a trailer bed 22 constructed in three sections; a center section 24, a rear section 26 and a forward section 28. The rear section 26 is hingedly connected to the center section 24 by a transversely oriented hinge structure 30 which may be comprised of a piano type hinge or a plurality of individual hinges. A similar hinge structure 32 connects the forward section 28 with the center section 24. The trailer 20, as shown, also includes a tongue 34 having a hitch device 36 connected to its outer extremity 37 and being slidably connected in a box channel 38 connected to the forward section of 28 of the trailer 20. A pin 40 is employed to retain the tongue 34 in the desired extended position as shown in FIG. 1 or retracted as shown in FIG. 2. The trailer 20 also includes a handle or skid 42 connected beneath the rear section 26 thereof. Suitable tail lights 44 and stake-type sides 46 of a conventional sort also are included.

As shown in FIG. 2, the center section 24 is supported by wheels 48 allowing the forward and rear sections 28 and 26 to be vertically rotated or folded with respect to the center section 24 so that storage space is conserved. To fold the trailer 20 requires the release of latches 50 which otherwise maintain the bed 22 of the trailer 20 in the planar position shown in FIG. 1. It is preferable that the center of gravity 51 of the folded trailer 20 be slightly forward of the axis 52 of the wheels 48 so that the folded trailer 20 tends to rotate toward the tongue 34. This enables the trailer 20 to be stood as shown in FIG. 2 with the tongue 34 moved and pinned with respect to the box channel 38 so that its inner end 54 can rest on the ground to support a portion of the weight of the trailer 20 and maintain it in the stable position shown. The handle 42 can also be used to stabilize the trailer 20 in its folded position, as shown in FIG. 2, by positioning the trailer 20 against an adjacent structure 55 with the bottom 56 of the handle 42 in abutment therewith.

The bed 22 of the trailer 20 can be constructed from conventional materials such as the channels 57 and sheets 58 shown in FIG. 3. The center section 24 includes two transverse channels 59 and 60 which have a shaft 62 connected therebetween at a midpoint across the trailer 20. The shaft 62 provides the pivot for a pair of Y-shaped transverse axle assemblies 64 and 66 which are connected and positioned to rotate thereabout. The arms 67 and 68 of the axle assembly 64 and the arms 70 and 72 of the axle assembly 66 each are connected in an alternate fashion by sleeves 73 positioned about the shaft 62 as shown in FIG. 4 so that the wheels 48 can move upwardly in response to irregularities in the pavement 74, but are otherwise restrained from motion. As shown in FIGS. 3 and 4, springs 76 and 78 bias the Y-shaped assemblies 64 and 66 downwardly so that a load in the trailer 20 is supported by the springs 76 and 78, the members 64 and 66 and the wheels 48. Suitable fenders 80 may be attached to the center section 24 as shown in position about the wheels 48, or may be connected to the assemblies 64 and 66 to move therewith.

Latches 50 suitable to maintain the sections 24, 26 and 28 in their planar configuration are shown in detail in FIG. 5. The latches 50 essentially are identical and each includes a stop member 82 connected to a channel forming the outer edge of the center section 24 and each having an abutment surface 84 positioned to engage an abutment surface 86 on the channel 57 forming a portion of the adjacent outer section. The two abutment surfaces 84 and 86 establish the planar positioning of the sections 24, 26 and 28 about the hinges 30 and 32. The latch 50 includes a handle member 88 pivotally engaged below and beneath an outer section channel 57 by a pivot 90. A hook member 92 is pivotally engaged by another pivot 94 to the handle member 88 between the pivot 90 and handle 96 thereof so that rotation of the handle member 88 in the direction of arrow 98 causes the end 100 of the hook member 92 to engage a portion of the adjacent channel member 57 as shown with respect to the center section 24 and the forward section 28. The point of contact 102 of the end 100 and the pivot 94 are on a line which is above the pivot 90 when the latch 50 is in its closed position. The hook member 92 is sized so that it is stressed about a bend 104 therein when in this overcenter position so that it tends to remain in this position. An attempted movement of the trailer sections to fold only results in the latch being more forcefully held in the closed position but suitable force on the handle 96 opposite to the arrow 98 can overcome the overcenter action and release the latch 50.

Tangs 106 may be provided adjacent the edges of the sections 24, 26 and 28 about the hinges 30 and 32. The tangs 106 are formed with orifices 108 therethrough which align when the trailer 20 is in its folded position. Ball detent pins, shown hereinafter, may be inserted within the orifices 108 in the tangs 106 to maintain the trailer 20 in its folded position.

The tongue 34 is maintained in position within the box channel 38 by the pin 40 as aforesaid which if not a ball detent pin may have an orifice 110 therethrough in which a hairpin shaped cotter key 111 is positioned. Although shown extending sidewardly through the channel 38 and the tongue 34, the pin may instead be positioned vertically as shown by pin 40' in FIG. 5.

An alternate latch arrangement is shown in FIG. 6 wherein a latch member 112 having a engagement surface 114 which engages a portion 116 of the channel 59 adjacent thereto below the hinge 32 and prevents the folding of the trailer sections. The member 112 is biased to the position shown in solid outline by means of a spring 118 which is connected at one end 120 to the member 112 and at the opposite end 121 to the hinge and stop member 122 thereof. A suitable control rod 124 can be extended from the latch member 112 for remote overcoming of the spring 118 and unlatching of the trailer sections 24, 26 and 28.

FIGS. 7 and 8 diagramatically show how the trailer 20 can be constructed with nestable sides that need not be removed for trailer folding. The sides 126 of the center section extend forward of the hinge 32 at which point they are bent into a U-shaped engagement portion 128. The opposite engaging portions 130 of the forward sides 132 are also U-shaped and extend just to the hinge line 32 so that the rearward most surface 134 thereof can act as a support against the bed 22 of the center section 24. When in the folded position shown in FIG. 8 the rearward edges 136 and the forward edges 138 of the center and rear sections respectively nest in a similar manner with the rearward most surfaces 140 engaging with the bed 22 of the rear section 26 to support it in a vertical position shown in FIG. 8. In this embodiment, the rear portion 26 is slightly longer than the forward section 28 so that the end wall 142 thereof extends over the end wall 144 of the forward section when folded as shown in FIG. 8.

The trailer 20 with interlocking stake sides 146 of the conventional sort is shown in FIGS. 9 through 12. Suitable orifices 150 are provided through the bed thereof so that the stakes 152 can be supported therein as shown. An alternate latch for the trailer 20 is shown in FIGS. 11 and 12 wherein second sets of tangs 153 and 154 are provided below the hinges 30 and 32 having orifices 156 therethrough which are similar to the tangs and orifices described above. The orifices 156 are positioned so that they align when the sections 24, 26 and 28 are in a planar condition so that a ball detent pin 158 when inserted therein locks the tangs 153 and 154 in the position shown for sections 24 and 26. As shown in FIG. 12, the tangs 106, 153 and 154 may be multiple so that the ball detent pin 158 has only shear loads applied thereto.

Thus there has been shown and described a novel foldup trailer which fulfills all the objects and advantages sought therefor. Many changes, modifications, variations and other uses and applications of the subject invention will, however, become apparent to those skilled in the art after considering this specification and the accompanying drawings. All such changes, modifications, alterations and other uses and applications which do not depart from the spirit and scope of the invention are deemed to be covered by the invention which is limited only by the claims which follow:

What is claimed is:

1. A trailer being foldable for storage and being extendable for transporting loads over the ground, comprising:
    a forward bed portion;
    a rear bed portion;
    a center bed portion positioned between said forward and rear bed portions and generally parallel to the ground;
    first transverse hinge means connecting said forward bed portion to said center bed portion for rotation of said forward bed portion between a horizontal position planar with said center bed portion and a vertical position perpendicular to and generally above said center bed portion;
    second transverse hinge means connecting said rear bed portion to said center bed portion for rotation of said rear bed portion between a horizontal position planar with said center bed portion and a vertical position perpendicular to and generally above said center bed portion;
    first lock means connected between said center bed portion and said forward bed portion for selectively retaining said center and forward bed portions in planar orientation with respect to each other for transporting loads;
    second lock means connected between said center bed portion and said rear bed portion for selectively retaining said center and rear bed portions in planar orientation with respect to each other for transporting loads; and
    a wheel assembly connected to said center bed portion for supporting said trailer on the ground.

2. The trailer defined in claim 1 wherein said forward bed portion includes:
    a trailer hitch tongue slideably attached thereto; and
    third lock means connected to said forward bed portion to engage said trailer hitch tongue in an extended position for towing and a retracted position for storage, said retracted position extending said tongue a distance beyond said first transverse hinge means generally equal to the distance said center portion is supported on the ground by said wheel assembly, whereby said retracted tongue provides a supporting contact with the ground when said forward bed portion is in a vertical position with respect to said center bed portion.

3. The trailer defined in claim 2 wherein said forward bed portion includes a box channel member at a right angle to said first hinge means and parallel to said forward bed portion, said trailer hitch tongue including a structural member sized and shaped to slide within said box channel member, said third lock means including a ball detent pin, and ball detent pin receiving orifices defined through said box channel member and said structural member.

4. The trailer defined in claim 1 wherein said first lock means includes:
    a first stop member positioned on said forward bed portion adjacent said first hinge means;
    a second stop member positioned on said center bed portion adjacent said first hinge means in position to engage said first stop member when said center and forward bed portions are in planar orientation; and
    overcenter latch means positioned between said center and forward bed portions to selectively retain said center and forward bed portions in planar relationship.

5. The trailer defined in claim 1 wherein said first lock means include:
    a first stop member positioned on said forward bed portion adjacent said first hinge means;
    a second stop member positioned on said center bed portion adjacent said first hinge means in position to engage said first stop member when said forward bed portion is rotated into planar orientation with respect to said center bed portion;
    at least one ball detent pin; and
    first receiving means on said center and forward bed portions for receiving said ball detent pin when said center and forward bed portions are in planar orientation so that said center and forward bed portions can be retained thereby in said planar orientation.

6. The trailer defined in claim 5 wherein said center and forward bed portions include second receiving means for receiving said ball detent pin when said center and forward bed portions are in perpendicular orientation so that said center and forward bed portions can be retained thereby in said perpendicular orientation.

7. The trailer defined in claim 6 wherein said first and second receiving means on said center and forward bed portions for receiving said ball detent pins each include a pair of spaced lock members on one bed portion and at least one lock member on the other bed portion defining orifices for receiving a ball detent pin.

8. The trailer defined in claim 1 wherein said bed portions each include upstanding body portions sized and shaped to nest together when said forward and rear bed portions are folded in said perpendicular orientation with respect to said center bed portion.

9. The trailer defined in claim 1 wherein said wheel assembly includes:
    a bearing shaft at a right angle to said first hinge means;
    a pair of axle assemblies each mounted to said bearing shaft at at least two separate locations for rotation thereabout; and
    at least one spring in engagement with each axle assembly on one end thereof and in engagement with said center bed portion on the other end.

10. The trailer defined in claim 1 wherein said wheel assemblies include wheels of a predetermined diameter and said structural member includes a trailer hitch on one end thereof and an abutment surface on the other end thereof, said ball detent pin receiving orifices having a position which maintains said structural member in position with said abutment surface in horzontal alignment with the bottom of said wheels when said bed portions are folded, said center bed portion being of a length similar to the diameter of said wheels which are generally centered therealong.

* * * * *